Oct. 18, 1966  R. H. KAMPFER  3,279,586
FLEXIBLE BOTTLE CONVEYOR CHAIN
Filed July 21, 1964
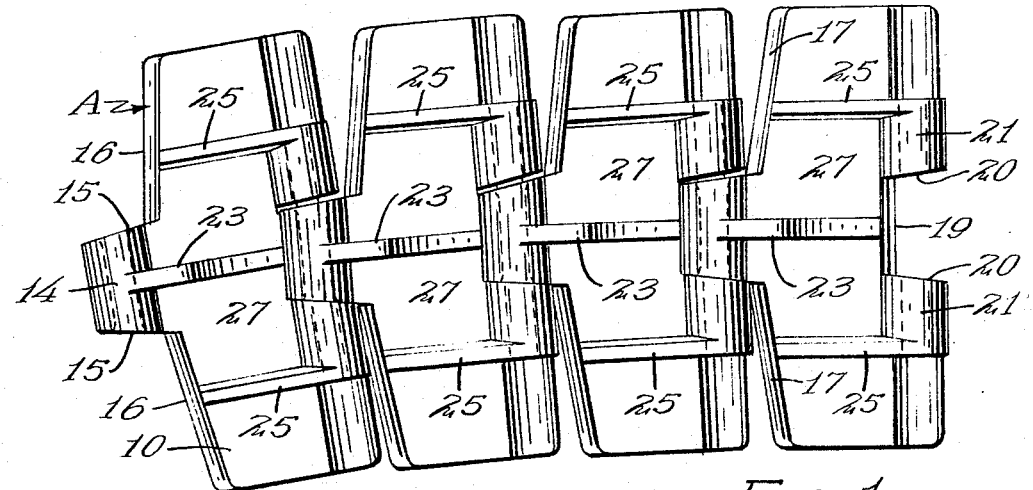
FIG. 1
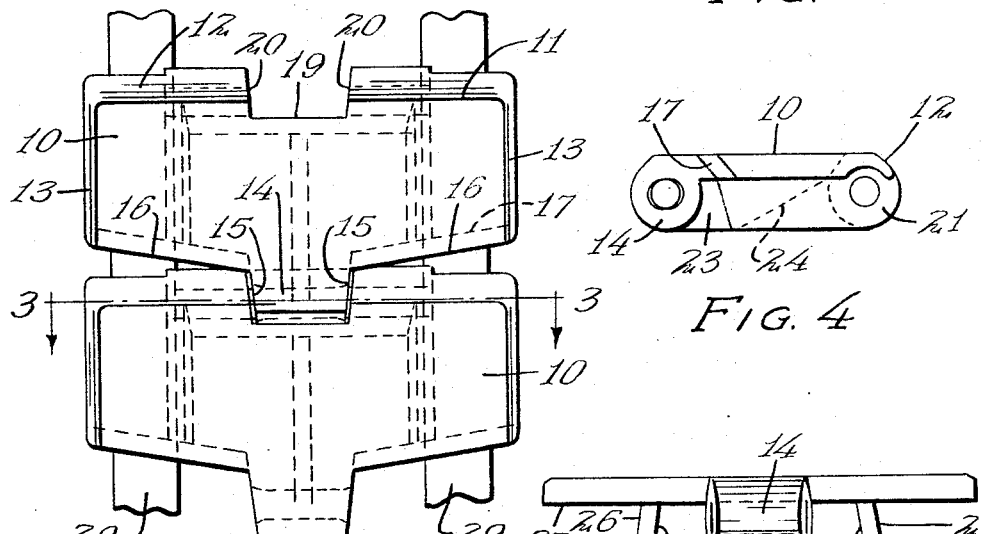
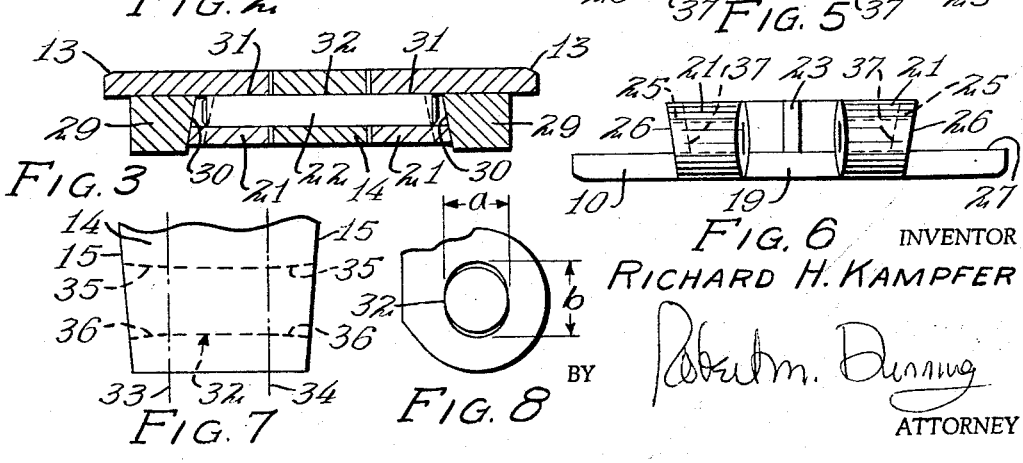
INVENTOR
RICHARD H. KAMPFER
BY
ATTORNEY

United States Patent Office 3,279,586
Patented Oct. 18, 1966

3,279,586
FLEXIBLE BOTTLE CONVEYOR CHAIN
Richard H. Kampfer, St. Paul, Minn., assignor to Conveyor Specialties Company, St. Paul, Minn., a corporation of Minnesota
Filed July 21, 1964, Ser. No. 384,165
3 Claims. (Cl. 198—189)

This invention relates to an improvement in flexible bottle conveyor chain and deals particularly with a link construction having certain advantages over previous forms of links.

During recent years, the use of conveyor chains having a flat table like surface and molded of plastic has increased in popularity. While such chains normally operate very effectively, occasionally some difficulty will be experienced due to some detail in the production. For example, from time to time when the conveyor is under stress, the links will not be engaged by the sprocket properly due to the arrangement of the reenforcements on the under surfaces of the links. For the most part in the past, the flights of the conveyor chains are designed to travel in a straight path. If the conveyor chains are to follow a curved or tortuous path, as described in my co-pending application, Serial No. 366,444, filed May 11, 1964, for "Conveyor Chain," the difficulties are accentuated. It is an object of the present invention to provide a conveyor chain made up of links connected so that the chain may follow a curved path and which will avoid difficulties previously experienced with such chain.

A feature of the present invention resides in the provision of a flexible conveyor chain having a projection of tapered form which fits into a tapered notch between a pair of cooperable projections on the next adjoining link. The tapered projection is sufficiently narrower than the notch into which it fits to permit angularity between adjoining links. The trailing edge of each link is curved to the extent necessary to permit the chain to travel about a curved path.

A further feature of the present invention resides in a specific form of aperture in the tapered projection. The center portion of this aperture is slightly elongated and the degree of elongation is increased at the ends of the apertures permitting the necessary angularity of the pivot pin extending through the aperture but without producing excessive play. In other words, the amount of play between the pivot pin and the projection is limited while the chain is traveling about a straight path, but the shape of the aperture still permits the links to assume an angle in passing about a curve.

A further feature of the present invention resides in the provision of a novel type of reenforcing structure on the under surfaces of the links. A single projection extends from the center of the link at the trailing edge thereof and a pair of projections are provided on the under surface of the forward edge of the link defining a notch therebetween for accommodating the projection of the next adjoining link. A reenforcing rib extends across the link in a direction of travel thereof, one such reenforcement extending across the center of the link and the other reenforcing ribs being flush with the outer edges of the pair of spaced projections. The outer reenforcing links are in planes diverging downwardly and outwardly from the under surfaces of the links. These outer reenforcing ribs are designed to engage similarly tapered edges of guide rails supporting the links to prevent the conveyor chain from climbing over the guide rails as the conveyor travels on a curved path. As a result, the bearing surface engaging the rails extends substantially the full length of the links in the direction of travel.

A further feature of the present invention resides in the fact that the inner surfaces of the outer reenforcing ribs of the links are substantially parallel to the outer surfaces so that the reenforcing ribs are slightly farther apart at their lower extremity than at their juncture with the plate forming the top of the link. As a result, these outer reenforcing ribs act as a guide for the sprocket and to correct any misalignment between the chain and the sprocket wheel.

These and other objects and novel features of the present invention will be more clearly and fully set forth in the following specification and claims.

In the drawings forming a part of the specification:

FIGURE 1 is a bottom plan view of a series of links showing the relation thereof as the chain moves about a slightly curved path.

FIGURE 2 is a top plan view of a pair of links resting upon the guide rails and supported thereby.

FIGURE 3 is a sectional view through a pair of connected links, the position of the section being indicated by the line 3—3 of FIGURE 2.

FIGURE 4 is a side elevational view of one of the links.

FIGURE 5 is a rear elevational view of one of the links.

FIGURE 6 is a front elevational view of one of the links.

FIGURE 7 is an enlarged detail showing the shape of the aperture through which the link pivot pin extends.

FIGURE 8 is a side elevational view of the lug illustrated in FIGURE 7.

The links A are preferably cast of a plastic such as Delrin and which requires no lubrication in traveling over the metal rails due to the fact that it inherently has a slippery quality. The links include a transversely elongated top plate or platform 10 having a substantially straight forward edge 11 which is inclined or tapered downwardly and forwardly as indicated at 12 in order to provide clearance with the next adjacent link. The upper side edges of the plates 10 are chamfered as indicated at 13. The trailing edge of each link includes a central projection 14, the side edges 15 of which are on rearwardly converging planes. The rear edges 16 of the plates 10 incline forwardly and outwardly from the projection 14 so as to provide clearance between the links while the links travel about a curved path. The rear edges 16 are downwardly and forwardly beveled as indicated at 17 to generally match the bevel 12 of the leading edge of the next adjacent link.

The forward edge 11 is centrally notched as indicated at 19, the side edges 20 of the notch tapering so that the base of the notch is somewhat narrower than the mouth thereof. The taper of the walls 20 conforms to the taper of the side walls 15 of the projection 14. As indicated in various figures of the drawings, a pair of downwardly extended rounded projections 21 are provided on opposite sides of the notch 19. The projections 21 are of somewhat similar cross section to the projection 14 and the projections 14 and 21 provide bearings for a hinge pin 22. The hinge pins 22 hold the links assembled.

As indicated in FIGURES 1, 2, and 6 of the drawings, a central reenforcing rib 23 extends across the bottom of each plate 10 emerging at its forward end with the projection 14 and extending below the plate 10 approximately the same distance as the projection 14. The forward end of the reenforcing rib 23 is tapered as indicated at 24, the rib preferably terminating at the forward edge of the plate or at the base of the notch 19. A pair of reenforcing ribs extend across the under surface of each plate 10, the ribs 25 being flush with the outer ends of the spaced projections 21. As indicated in FIGURE 6 of the drawings, the outer surfaces 26 of the reenforcing ribs 25 are arranged on planes which diverge downwardly and outwardly from the under surface 27 of the plate 10, showing the plate in inverted position. As a result, the lower edges of the reenforcing ribs 25 are farther apart at their lower extremity than at their juncture with the plate 10. The purpose of this arrangement is perhaps shown by an examination of FIGURES 2 and 3 of the drawings. These views show parallel supporting guide rails 29 upon which the under surfaces of the plates ride, these rails acting to support and guide the conveyor in its path. As shown in FIGURE 3, the inner surfaces 30 of the guide rails 29 are arranged on planes which also diverge downwardly and outwardly at approximately the same angle as the sides 26 of the reenforcing ribs 25. It is the engagement of the reenforcing ribs 25 with the guide rails 29 which permits the conveyor to travel along a curved or tortuous path without danger of having the link climb out of the guide rails as tension is applied to the chain. This arrangement is somewhat similar to that disclosed in my previous application above mentioned. However, in this previous application relatively small areas of the links engage the guide rails. The present construction provides a considerably greater bearing area as it extends entirely across each link.

The pivot pin 22 is frictionally engaged in apertures 31 in the bosses or projections 21, and usually terminates short of the outer surfaces thereof in order to not engage against the rails 29. The center projection 14 is provided with an aperture 32 which is shaped as best indicated in FIGURES 7 and 8 of the drawings. The letter (a) indicates the vertical height of the aperture 32, this dimension being substantially equal to the diameter of the pin 22. The dimension (b) is somewhat greater than the diameter of the pin 22 and may be 0.030 inches larger than the diameter of the pin so that the aperture 32 is elongated in a plane parallel to the plate 10 and in a direction longitudinally of the direction of travel of the link.

The center portion of the aperture 32, between the broken lines 33 and 34 are of the height (a) and width (b). Beyond the broken lines 33 and 34, the ends of the aperture 32 flare outwardly as indicated by the curved lines 35 at the forward side of the aperture and the curve lines 36 along the rear side of the aperture. The purpose of this arrangement is to permit the desired angularity between the links when the conveyor is traveling about a curved path without elongating the aperture 32 to the extent necessary to permit the maximum angularity between the links. When the conveyor chain is under tension, the pivot pins 22 will engage against the rear side of the aperture and angular movement of one link relative to the other would cause the hinge pin to fulcrum about one end or the other of the rear edge of the aperture. By making the center portion of the aperture uniformly elongated and flaring the end portions of the aperture in the manner illustrated, the point of the bearing of the pin against the aperture will vary as the degree of angularity changes preventing the strain from being directed against the ends of the aperture. In FIGURE 7, the center of curvature of the curved lines 35 and 36 lies on extensions of the broken lines 33 and 34.

While the links A serve the same general purpose as links previously produced, they do vary in certain respects which are of importance to the perfect operation of the chain. The reenforcing ribs 25 which extend completely across the links materially increases the bearing surface of the links with respect to the guide rails 29 and materially decreases the wear upon the links. By making the inner surfaces 37 of the reenforcing ribs 25 parallel to the outer inclined surfaces 26, the inner walls of these ribs act as a guide to correct any misalignment of the chain with respect to the sprockets. The particular shape of the aperture 32 with its flaring ends is also of importance as the point of bearing of the pivot pin varies with the angularity between links. Where the aperture was of the same cross section throughout its links, any angularity between links caused the pressure of the pivot pin to be exerted against the projections at the end of the aperture.

In accordance with the patent statutes, I have described the principles of construction and operation of my improvement in flexible bottle conveyor chain, and while I have endeavored to set forth the best embodiment thereof, I desire to have it understood that changes may be made within the scope of the following claims without departing from the spirit of my invention.

I claim:
1. A conveyor chain link including: a flat generally rectangular top plate, a central projection beneath said plate extending from an edge of the plate longitudinally of the direction of movement, a pair of spaced projections beneath said plate along the opposite edge thereof and adapted to accommodate the central projection of a similar link therebetween, said projections being transversely apertured to accommodate a hinge pin connecting the central projection of one link between the spaced projections of an adjacent link, and a pair of reinforcing ribs extending across said links from the outer edges of said spaced projections, said reinforcing ribs being parallel to the longitudinal axis of the link in which the outer surfaces of said reinforcing ribs are on planes which converge upwardly and inwardly and intersect on a vertical plane through the longitudinal axis of the link.

2. The structure of claim 1 and in which the inner surface of each rib is substantially parallel to the outer surface thereof.

3. A chain link designed for pivotal connection with similar links to form a conveyor chain, the link including:
   a flat plate having a forward edge at substantially right angles to the direction of movement of the links and an angular trailing edge the opposite ends of such diverge forwardly at an acute angle to a line at right angles to the direction of travel,
   a central projection projecting from the trailing edge and extending below said plate,
   a pair of spaced projections on the forward edge of said plate extending below said plate and spaced to accomodate therebetween the central projection of a similar adjoining link,
   a pivot pin supported by said spaced projection and secured in normally fixed relation between said spaced projections,
   said central projection having an aperture therethrough adapted to accomodate the pivot pin of an adjacent link,
   said aperture having a height substantially equal to the diameter of the pin, and having an intermediate portion horizontally elongated in the direction of travel of the link, and oppositely flared end portions on either side of said intermediate portion,
   said plate including a pair of parallel reinforcing ribs extending across said plate from the forward to the trailing edge thereof and having their outer surfaces flush with the outer ends of said pair of projections, and
   said outer rib surfaces being arranged on planes converging upwardly and inwardly to be closer together at their juncture with said plate than at their lower edges.

References Cited by the Examiner
UNITED STATES PATENTS

| | | | |
|---|---|---|---|
| 1,804,701 | 5/1931 | Mojonnier | 198—189 |
| 2,256,005 | 9/1941 | Wood | 198—189 X |
| 2,694,484 | 11/1954 | Grebe | 198—189 X |
| 3,107,777 | 10/1963 | Steorts | 198—189 |

FOREIGN PATENTS 944,137   12/1963   Great Britain.

EVON C. BLUNK, *Primary Examiner.*

EDWARD A. SROKA, *Examiner.*